July 16, 1935.   N. A. PALMGREN   2,008,336
ROLLER BEARING
Filed Dec. 28, 1933   3 Sheets-Sheet 2
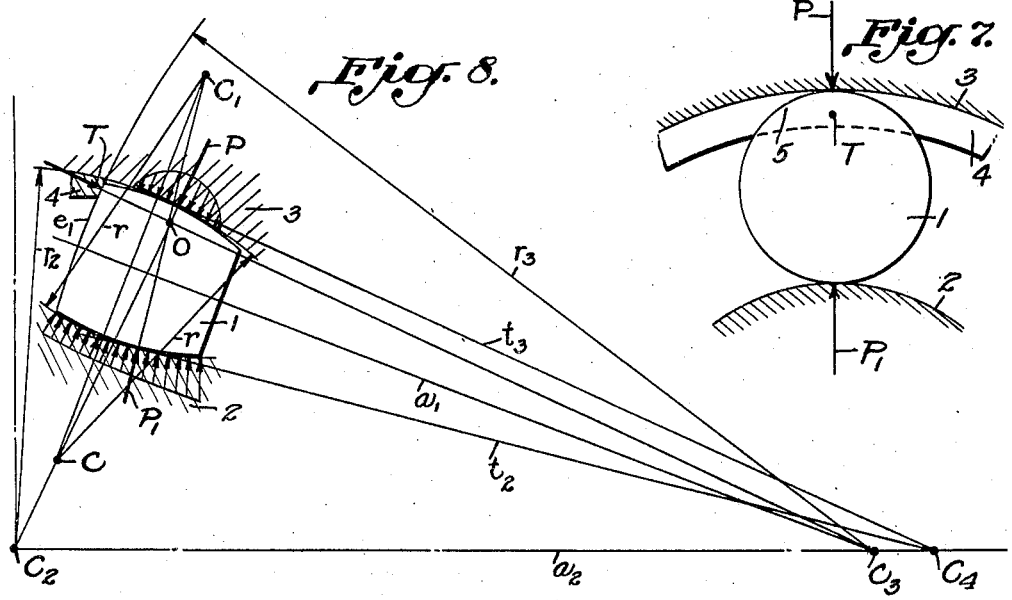
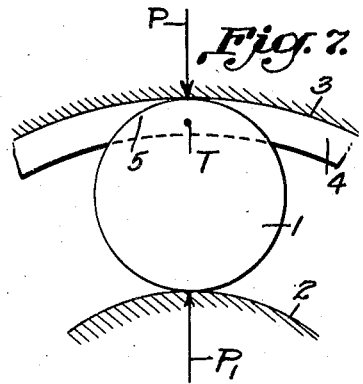
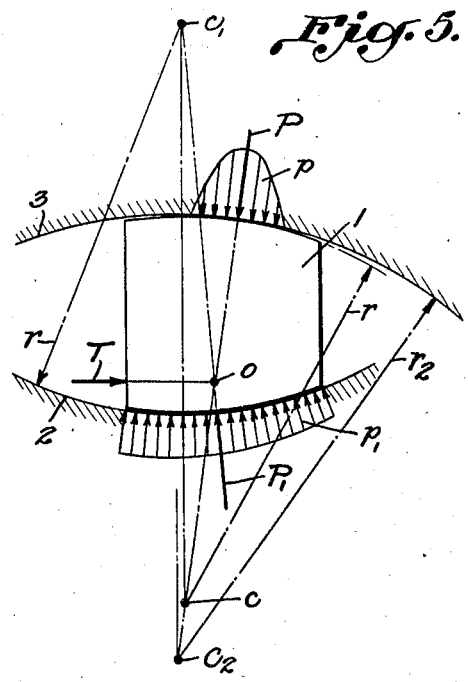
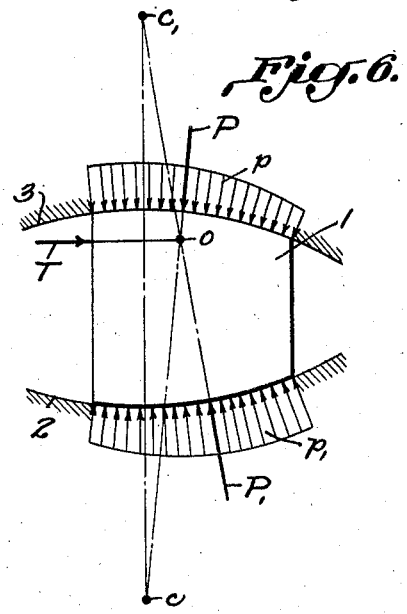
Inventor:
Nils Arvid Palmgren
BY Chas. Lyon Russell
his ATTORNEY

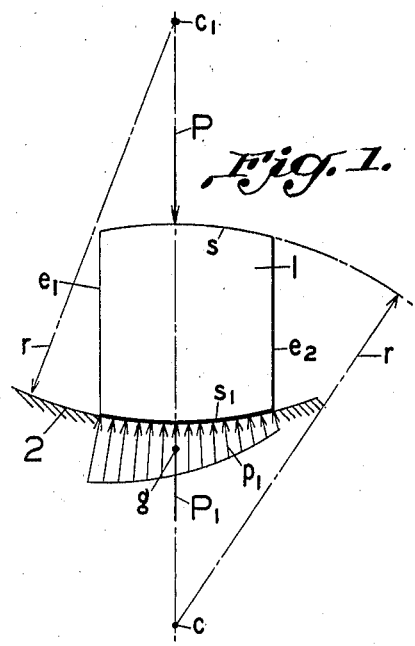
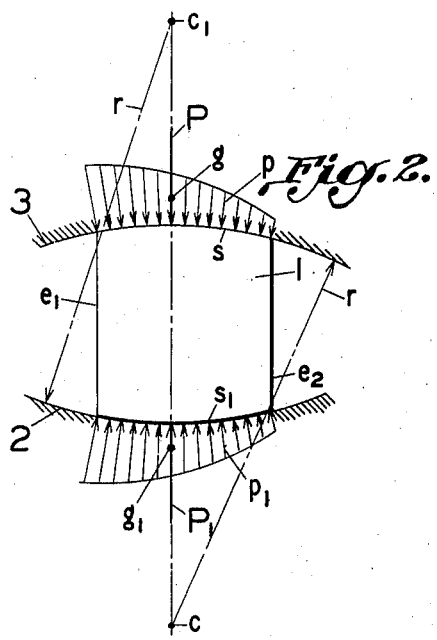
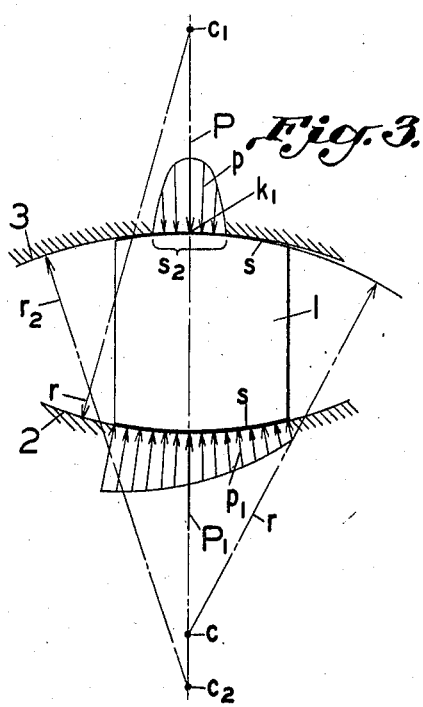
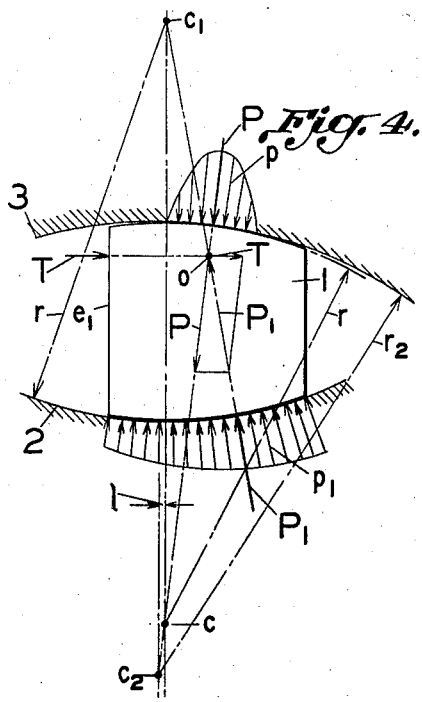

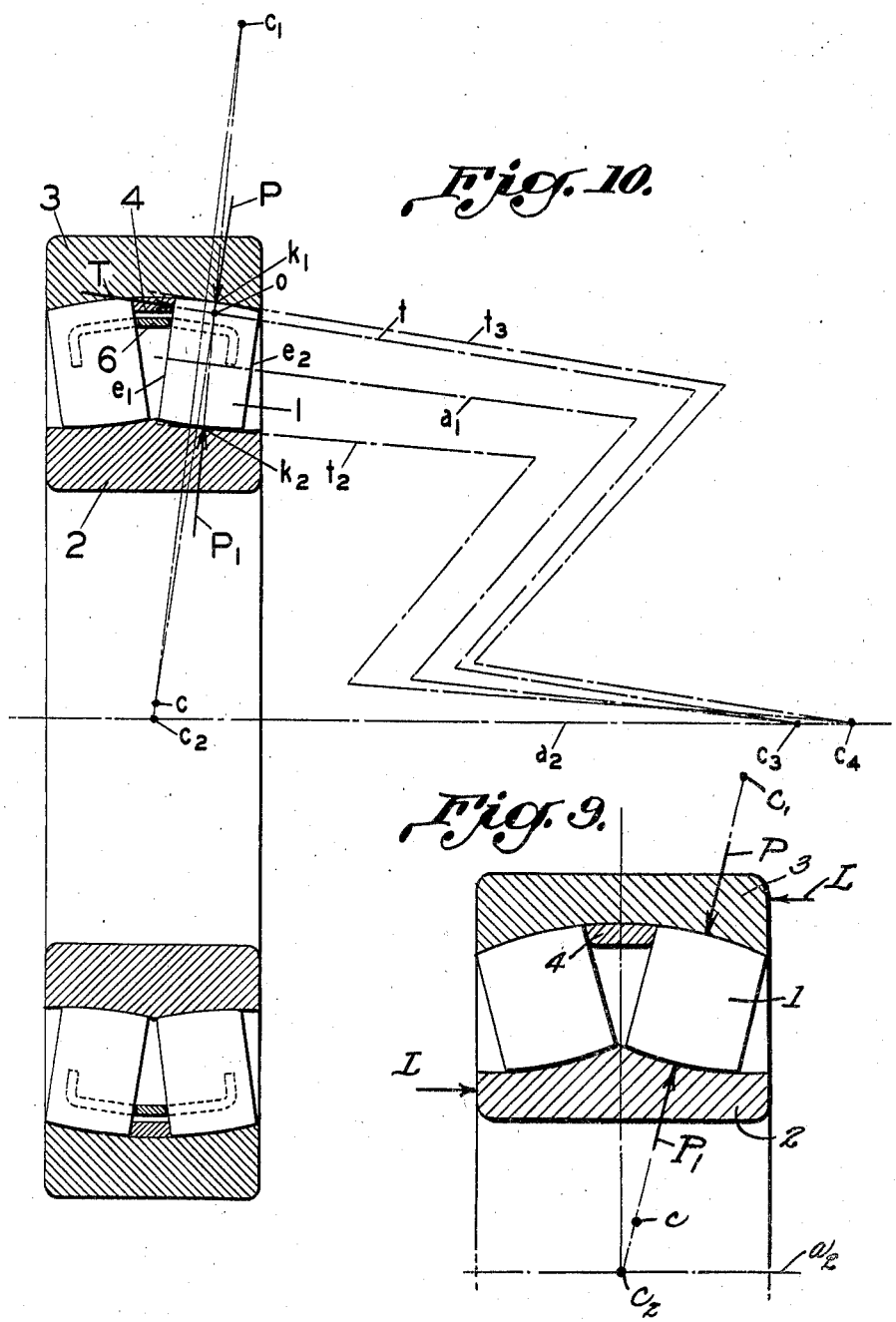

Patented July 16, 1935

2,008,336

UNITED STATES PATENT OFFICE 2,008,336

ROLLER BEARING

Nils Arvid Palmgren, Göteborg, Sweden, assignor to Aktiebolaget Svenska Kullagerfabriken, Göteborg, Sweden, a corporation of Sweden Application December 28, 1933, Serial No. 704,239
In Sweden March 4, 1933

9 Claims. (Cl. 308—214)

The object of my invention is to obtain a roller bearing combining the qualities of high load carrying capacity and low friction with a lower cost of production than it has hitherto been possible to obtain. A special object is to avoid flanges integral with the race ring, in order to avoid the considerable cost connected with the machining and finishing of such flanges. Another object of the invention is to provide a roller bearing capable of carrying considerable thrust load but in which there will be no excessive forces acting against the end surfaces of the rollers and in which no flanges integral with the roller races will be required. A further object is to design a fully self-aligning double row roller bearing, especially adapted for narrow types, having a load carrying capacity greater than that which can be obtained with similar bearings having fixed flanges. Finally another important object of my invention is to design a bearing having two rows of rollers of substantially conical form in which the rollers are supported axially by means of a loose flange, but in which nevertheless the rollers will be in static equilibrium when the bearing is subjected to thrust. The desired results are obtained thereby that the bearing is provided with two rows of rollers of curved profile between which a loose guide ring is inserted, the guide ring being so dimensioned that it automatically exerts, on all rollers subjected to radial load from the race ring, an axial force which is proportional to the radial load.

In order to be able to understand the design and working of the bearing it is necessary to have a clear conception of the action of the forces in a roller bearing under different circumstances.

To assist in this understanding reference will be made to the accompanying drawings in which drawings Figure 1 is a diagram illustrating the side of a roller and a fragment of its inner race member and some of the pertinent lines of force.

Fig. 2 is a view somewhat similar to Figure 1, but showing fragments of both race members. In this illustration the roller is shown as having line contact with both race members.

Fig. 3 differs from Fig. 2 in that the roller is represented as having point contact with the outer race member.

Fig. 4 represents a bearing wherein the roller has line contact with the inner race and point contact with the outer race and is influenced by a thrust load applied to its end near the outer race.

Fig. 5 shows approximately the same formation of races and roller as that illustrated in Fig. 4, but the thrust is applied to the end of the roller near its inner race.

Fig. 6 shows the roller having line contact with both the inner and the outer race and the thrust applied to the end of the roller near its outer race.

Fig. 7 is an end view of the parts illustrated in Fig. 8.

Fig. 8 is a diagram illustrating a thrust receiving ring located upon the outer race and engaging the roller adjacent such outer race, the position of the axis of the roller in relation to the indicated axis of the bearing being somewhat distorted.

Fig. 9 is a cross section of the inner and outer race members of a two row bearing showing the thrust receiving member located between the rollers and riding upon the outer race members, and being subjected to thrust load, and Fig. 10 is a cross section of a complete bearing made in accordance with my invention which I regard at the present time as the preferred form.

Fig. 1 shows a roller bearing roller having a profile formed as the arc of circle $s$ ($s_1$) having a radius $r$. The centre of this arc is located at a point $c$ ($c_1$).

The roller is supported by a member 2 having a surface with a profile formed as an arc of a circle having a radius $r$ and center $c_1$. The roller, therefore, contacts with the supporting member along the whole length of the former. This type of contact is called line contact.

If the roller is now subjected to a load P acting perpendicular to the roller at the point where the line connecting the points $c$ and $c_1$ intersects the surface $s$, the roller will be pressed against the supporting member 2. At different points of the line of contact at $s_1$ (which in reality is a narrow rectangular surface due to the elastic deformation of the material under load) partial forces $p_1$ will act which may be composed to form the resultant $P_1$. Since the roller is in perfect equilibrium, the resultant $P_1$ will balance the force P, in other words, it will be automatically equal to the force P and will act along the same line of force but in the opposite direction to the force P in accordance with the law of action and reaction.

The partial forces $p_1$ are all directed perpendicular to the contact surface of the roller, since it has been scientifically proved that no stable tangentially directed frictional forces can exist on the rolling surface between a rolling roller and its supporting surface. The partial forces $p_1$ are therefore all directed towards the point $c_1$ which is the centre of curvature of the line of contact. This is also in agreement with the conditions for static equilibrium which is that the resultant $P_1$ of the partial forces $p_1$ must pass through the point $c_1$.

If, as is the case with the roller shown in Fig. 1, the end surfaces $e_1$ and $e_2$ of the roller are at different distances from the plane containing the greatest diameter of the roller which passes through the points $c$ and $c_1$ the result will be that the partial forces $p_1$ at the different points of the line of contact will be unequal as shown in the figure. The pressure will therefore be unequally divided along the line of contact in the manner shown in the figure. The distribution of the pressure is determined thereby that the resultant $P_1$ must pass through the center of gravity $g_1$ of the surface composed by the partial forces $p_1$ in the graphical representation.

If the same roller is now presumed to be subjected to load between two members 2 and 3 according to Fig. 2, both having the same curvature as the roller, the force P will be composed of the partial forces $p$ distributed along the line of contact $s$ in the same manner as the force $P_1$ is composed of the partial forces $p_1$ at the line of contact $s_1$.

Assume now that the contact at $s_1$ is line contact as in Figs. 1 and 2 but that the member 3 has a greater radial curvature $r_2$ than the radial curvature $r$ of the roller. Fig. 3 illustrates this case when the center of curvature $c_2$ of the member 3 is located on the extension of the line $c_1$—$c$. The roller will then contact with the member 3 only at the point $k_1$ or, when the roller is loaded, the contact will have the form of an elliptical surface $s_2$. This type of contact is called point contact. Fig. 3 therefore shows the pressures and their distribution on the rollers when the rollers are not subjected to thrust and when they have line contact at one side and point contact at the other.

If the roller is now subjected to a force T acting against one end surface $e_1$, as in Fig. 4, the equilibrium of the roller is disturbed and the roller is automatically constrained to assume a new position in which a static equilibrium will be attained. This fact necessitates that the points of application of the forces P and $P_1$ be altered. The lines of action of both forces must, however, pass through the points $c$ and $c_1$ because, as has been before explained, these forces always act perpendicularly to the surface of the rollers. The force P must further always act perpendicularly to the supporting surface 3, in other words, the line of action of the force P must pass through both points $c$ and $c_2$. The static equilibrium, therefore, requires that the roller 1 and the supporting member 2 be displaced a distance $l$ relative to the supporting member 3. The three forces P, $P_1$ and T now balance each other. According to the law of the parallelogram of forces the lines of action of all three forces will intersect at a common point, in this case at the point $o$. The position of this point can be determined if the lines of action of two of the forces are known. Since the force T acts in the manner shown in Fig. 4 and the force P passes through the point $c$ and $c_2$, the point $o$ is determined and the force $P_1$ must act along a line passing through the points $o$ and $c_1$. The force $P_1$ is thus determined in size and direction by the size and direction of the forces P and T since $P_1$ is the reaction of the resultant of P and T.

The position of the point $o$ will, of course, vary if the location of the line of action of the force T is changed. Fig. 5 shows the position of the forces and of the point $o$ if the force T is applied to the end surface of the roller near the supporting member 2. If the line of action of the force P remains unaltered, the point $o$ will be moved automatically in agreement with the line of action of the force P, since $o$ is the point of intersection between the lines of action of the forces P and T. The force $P_1$ will therefore be moved somewhat if the force P is moved.

The direction of the forces and the position of the point of intersection are in principle the same, even if the roller makes line contact on both sides as shown in Fig. 6. In this case there is, however, no fixed point of application of the force P and, therefore, even an infinitely small axial relative change in position between the members 2 and 3 will shift the points of application of the forces P and $P_1$ toward the end of the roller. The position of the point $o$ will, therefore, depend on the exactness with which the bearing is made. On this account it is always advantageous in practice to make the roller bearing so that the rollers have point contact at at least one of the bearing races.

From the above it will be apparent that if the direction and position of the forces P and T are fixed, the angle between the three forces P, $P_1$ and T will also be fixed, see Fig. 4. The parallelogram of forces is also fixed, since each of the forces has a certain definite magnitude relative to the other two forces. The force T thus always comprises a certain definite fraction of the force P. If P=zero then T=zero and if P increases, the force T also increases in the same proportion.

As is well known, it has been found advantageous to have the rollers of a roller bearing press axially against a flange. By suitably forming the end surfaces of the rollers and the surface of the flange it is possible to obtain an exact guidance of the rollers so that they will not skew. If a roller 1 in accordance with Fig. 7 is interposed between an inner race ring 2 and an outer race ring 3 and if a flange 4 is located for instance at the outer race ring and is so formed that it engages the end surface of the roller on a surface 5 having comparatively great extension in the direction of rolling, the roller will be positively supported so that all skewing will be prevented. The pressures $P_1$ and P acting on the races act always in the radial plane and for this reason their axial resultant T will always be located within the surface 5, even if certain skewing forces act on the roller. A supporting surface of this kind can be obtained if the roller, races and flange are designed according to the disclosures herein contained. For assistance in this portion of the description reference will be made to Fig. 8. The axis of rotation $a_1$ of the roller 1 intersects the axis of rotation $a_2$ of the bearing at the point $c_3$. The groove of the inner race ring 2 has a radius of curvature $r_1$ the center of curvature being located at the point $c_1$. The outer ring has a spherical race with a radius $r_2$ and center of curvature at $c_2$. The radii of the profile of the roller is $r$. The centers of curvature of the profiles of the rollers in the plane of the paper are, therefore, located at the points $c$ and $c_1$. The force P acting between the roller 1 and the outer race ring 3 must pass through the points $c$ and $c_1$ in accordance with what has been previously shown. The force is, therefore, applied near the middle of the roller, and its line of action thus forms an angle with the line $c$—$c_1$. In order that the roller may be in equilibrium it is, therefore, necessary that the flange 4 engages the larger end surface of the roller with the force T. The larger end surface $e_1$ of the roller is convex spherically formed, having a radius $r_3$ and its center at the point $c_3$. The side face of the flange has also the same spherical form with the radius $r_3$ and its center at $c_3$. The flange and the roller will, therefore, have surface contact of the form shown in Fig. 7. Since the force T must be directed vertically against the surfaces, its line of action passes through the point $c_3$. The forces P, $P_1$ and T acting on the roller intersect at the point $o$.

If we now assume that the flange 4 is removed or is made so narrow that it cannot exert a force T on the roller, the equilibrium of the roller will be destroyed. The forces P and $P_1$ would no longer be able to maintain the directions shown in Fig. 8. The roller would then shift inwardly towards the central plane of the bearing until the points $c_1$, $c$ and $c_2$ come into line with each other. The forces P and $P_1$ will then act along this line and counteract each other, whereat the roller is again in static equilibrium, and there will be no further axial adjustment of the roller. The action of the forces is then that shown in Fig. 9. The new equilibrium will be attained only if the profile of the roller is curved. The axial adjustment of the roller, required for attaining the equilibrium is very inconsiderable if the point $c$ is located near the point $c_2$, that is if the radius $r_2$ is only inconsiderably greater than the radius $r$. It is further desirable to make both these radii of about the same length, since there will be close contact between the roller and the outer race, and the load carrying capacity of the bearing will be high.

In this connection it is of importance to observe the fundamental difference between this design and that of a bearing having purely conical rollers. In a bearing of the latter type the rollers cannot attain equilibrium, since the forces acting on tapered rollers always form an angle with each other and it is therefore necessary that there be a force acting against the larger end surface of the roller, in order to hold the roller in equilibrium.

As long as the bearing is subjected to purely radial load the force P will be equal to the force P' and the force T equal to the force T'. When the bearing is subjected to thrust L, as in Fig. 9, the rollers of both rows of rolls will be shifted a very small distance to the left, until the forces P and P' directly counteract each other and the equilibrium has been restored while the bearing takes up the thrust forces.

The axial shifting of the rows of rollers required for attaining the new equilibrium causes, it is true, an additional load on the rollers in both rows but both the axial shift and the additional load can be diminished to any required degree by locating the point $c$ nearer to the point $c_2$. If these points coincide, there will be line contact between the roller and the outer race and both the axial shifting and the additional load will then be zero. It is, therefore, desirable to make the contact between the roller and the outer race as close as manufacturing methods allow. The contact should be what may be termed a very close point contact.

Fig. 10 shows a complete roller bearing in which the rollers 1 have curved profile and the inner end surface $e_1$ is of greater diameter than the outer end surface $e_2$, in other words, the rollers may be said to be tapered. The inner race ring 2 has two curved race grooves, one for each of the two rows of rollers. The radii of curvature of the profile of the roller and of the race groove are equal, both having their centers at the point $c_1$. The roller, therefore, makes line contact with the inner race ring. The outer race ring 3 is provided with a spherical race common to both rows of rollers and having its center at the point $c_2$. The radius of curvature of the roller profile is slightly less than the radius of the sphere, and the center of curvature of the roller is, therefore, located at a point $c$ which does not quite coincide with the point $c_2$. The greatest diameter of the roller is located on the connecting line between the points $c$ and $c_1$. The point of contact between the rollers and the outer race is located at the point $k_1$ which is located sideways of the line $c$—$c_2$ since the point $k_1$ must lie on the extension of the line $c$—$c_2$. The tangent $t_3$ to the roller at the point $k_1$ intersects the axis $a_2$ of the bearing at a point $c_4$ just beyond the point $c_3$ which is the point of intersection between the axis $a_1$ of the rollers and the axis $a_2$ of the bearing.

The guide ring 4, having such a great width axially as to compel the rollers sideways towards the respective sides of the bearing, is inserted between the rows of rollers, the guide ring being wider than the space which would exist between the loaded portions of the sets of rollers at the position assumed by the rollers, were the guide ring not present. It bears against the spherical race of the outer ring with a sliding fit so that it is centered by the outer ring but can swivel and may be axially shifted somewhat. The side faces of the guide ring engaging the end surfaces of the rollers are spherically formed and having the center of the sphere located at the point $c_3$. The larger inner end surfaces of the rollers are spherical and also have their centers located at the point $c_3$. The rollers therefore engage the guide ring on a spherical surface. The rollers are separated by a cage 6 which also prevents the rollers from falling out of the bearing when the latter is being assembled.

Since the width of the guide ring is so great that the roller is forced to engage the outer race at the point $k_1$ the guide ring exerts a pressure T against the greater end surface $e_1$ of the roller. The resultant $P_1$ of the forces P and T which must pass through the point of intersection $o$ of the lines of action of the forces P and T must be directed towards the point $c_1$ and, therefore, intersects the line of contact between the roller and the inner race at a point $k_2$. The tangent $t_2$ to the roller at this point intersects the axis of the bearing near the point $c_4$ whereby the friction in the bearing will be a minimum. The bearing is designed in such a manner that the guide ring 4 has such a width that the forces P and $P_1$ are applied to the roller near the middle of the roller, whereby the distribution of the forces will be as favourable as possible and the load carrying capacity of the bearing will be a maximum.

The direction and the relative magnitude of the forces acting upon the rollers, which are of deciding importance for the properties of the bearing with reference to both load carrying capacity and friction are, therefore, fixed by the form and dimensions of the bearing parts. The axial width of the guide ring 4 is of deciding importance for the attainment of the required result.

Since the guide ring has a width which is greater than the space between the rows of rollers if there were no guide ring, the thrust force T is obtained. This force is of prime importance for the effectiveness of the guidance of the rollers, because it constrains the end faces of the roller to assume the position perpendicular to the axis of the bearing, determined by the side face of the guide ring and further the radial forces P and $P_1$ acting on the roller are compelled to act at points near to the middle of the roller whereby the load carrying capacity of the bearing is increased and the friction at the same time diminished.

Since the guide ring 4 has been located near to the outer race ring 3, none of the axial space available for the roller contact is lost and the whole axial width of the bearing is made available for carrying loads. Since the guide ring 4 can be swiveled relative to the outer race ring, the self-aligning capacity of the bearing is maintained.

Having thus described my invention, I claim and desire to secure by Letters Patent:

1. A roller bearing consisting of an outer bearing ring, an inner bearing ring having two curved race grooves, two sets of rollers with curved profiles interposed between said bearing rings and a guide ring disposed between the sets of rollers, the axial position of the guide ring being determined by the two sets of rollers, the said guide ring being wider than the space which would exist between the loaded portions of the sets of rollers, were the guide ring not present, whereby it exerts a pressure on the end surfaces of the rollers.

2. A roller bearing according to claim 1, characterized in that the rollers bear against the outer race with very close point contact.

3. A roller bearing consisting of an outer bearing ring with a spherical race groove, an inner bearing ring with two curved race grooves, two sets of rollers with curved profile, interposed between said bearing rings, and a guide ring disposed between the sets of rollers, the axial position of the guide ring being determined by the two sets of rollers, the inner end diameter of each roller being greater than the outer end diameter, whereby the rollers will be of substantially tapered form, the guide ring being wider than the space which would exist between the loaded portions of the sets of rollers, were the guide ring not present, it being of such a magnitude that the resultants of the forces acting between a roller and the respective bearing races pass in the vicinity of the middle of the roller.

4. A roller bearing according to claim 3, characterized in that the tangents to the roller at the points of application of the resultants of forces acting between roller and races intersect in the vicinity of the point of intersection between the axes of rotation of the rollers and the axis of rotation of the bearing.

5. A roller bearing according to claim 3, characterized in that the guide ring bears against the surface of the spherical outer race groove with a sliding fit.

6. A roller bearing according to claim 3, characterized in that the side face of the guide ring resting against the rollers is spherical with its center in the vicinity of the point of intersection between the axes of rotation of the rollers and the axis of rotation of the bearing.

7. A roller bearing according to claim 3 characterized in that the inner end surfaces of the rollers, bearing against the guide ring, are spherical, with their centers in the vicinity of the point of intersection between the axes of rotation of the rollers and the axis of rotation of the bearing.

8. A roller bearing consisting of an outer bearing ring having a spherical race, an inner bearing ring having a pair of curved race grooves, the radius of curvature of which is practically equal to the radius of curvature of the race groove in the outer bearing ring, two sets of rollers having curved profiles interposed between said bearing rings, the radius of curvature of the roller profile being practically equal to the radius of curvature of the race grooves, a guide ring disposed between the sets of rollers, the axial position of the guide ring being determined by the two sets of rollers and a roller retainer, the guide ring having such an axial width that it exerts a pressure on the inner end surfaces of the rollers of such a magnitude that the tangents to the roller at the points of application of the resultants of forces acting between a roller and the respective bearing races intersect in the vicinity of the point of intersection between the axes of rotation of the rollers and the axis of rotation of the bearing when the bearing is subjected to radial load.

9. A roller bearing consisting of an inner bearing ring having a pair of curved race grooves, an outer bearing ring having a spherical race, two sets of rollers with curved profiles interposed between said bearing rings, a roller retainer and a guide ring disposed between the sets of rollers and bearing against the spherical outer race groove with a sliding fit, the axial position of the guide ring being determined by the two sets of rollers, the radius of curvature of the roller profile being practically equal to the radius of curvature of the respective race in one of the bearing rings and slightly shorter than the radius of curvature of the race in the opposite bearing ring, the diameter of the inner end of a roller being greater than the diameter of the outer end, the inner end surface of the roller having a substantially spherical shape, the center of which is located in the vicinity of the point of intersection between the axes of rotation of the rollers and the axis of rotation of the bearing, the guiding surface of the guide ring having a substantially spherical shape, the center of which is located in the vicinity of the point of intersection between the axes of rotation of the rollers and the axis of rotation of the bearing, the guide ring riding on the outer race, the guide ring having such an axial width that it exerts a pressure on the inner end surfaces of the rollers of such a magnitude that the tangents to the roller at the points of application of the resultants of forces acting between the roller and the respective bearing races intersect in the vicinity of the point of intersection between the axes of rotation of the rollers and the axis of rotation of the bearing, when the bearing is subjected to radial load.

NILS ARVID PALMGREN.